United States Patent [19]

Yoshida et al.

[11] Patent Number: 5,428,584
[45] Date of Patent: Jun. 27, 1995

[54] PICKUP DEVICE FOR A MAGNETO-OPTICAL INFORMATION RECORDING SYSTEM

[75] Inventors: Yoshio Yoshida, Nara; Hiroyuki Yamamoto, Tenri; Renzaburou Miki, Tenri; Kuniaki Okada, Tenri; Yukio Kurata, Tenri; Kouji Minami, Gose, all of Japan

[73] Assignee: Sharp Kabushiki Kaisha, Osaka, Japan

[21] Appl. No.: 97,399

[22] Filed: Jul. 23, 1993

[30] Foreign Application Priority Data

Jul. 29, 1992 [JP] Japan .................. 4-202125

[51] Int. Cl.$^6$ ............................. G11B 11/00
[52] U.S. Cl. ................... 369/13; 369/44.11; 369/112
[58] Field of Search ............ 369/13, 112, 44.11, 369/44.21, 114, 116, 110, 14, 44.26, 44.38, 44.39, 47; 360/114; 250/201.2, 201.5, 227.11; 385/14, 36, 130

[56] References Cited

U.S. PATENT DOCUMENTS

| | | | |
|---|---|---|---|
| 4,868,803 | 9/1989 | Sunagawa et al. | 369/13 X |
| 4,945,527 | 7/1990 | Sunagawa | 369/44.11 |
| 4,971,414 | 11/1990 | Funato et al. | 369/44.11 X |

FOREIGN PATENT DOCUMENTS 63-261556  6/1988  Japan .

OTHER PUBLICATIONS

Y. Yoshida et al., *Optical Data Storage Technologies*, SPIE 1401:58-65 (1990).

Y. Kurata et al., *Optical Storage and Scanning Technology*, SPIE 1139:161-168 (1989).

H. Sato et al., *Sharp Technical Journal*, 50:20-24 (1991).

*Primary Examiner*—Georgia Y. Epps
*Assistant Examiner*—Ali Neyzari
*Attorney, Agent, or Firm*—David G. Conlin; Peter F. Corless

[57] ABSTRACT

An optical information reproducing device includes a light source for generating a light beam, an optical system for converging the light beam generated by the light source on a magneto-optical recording medium on which recording information is recorded and for converging a return light beam reflected from the magneto-optical recording medium, beam splitting means for splitting the return light beam into split light beams, first detecting means for receiving one of the split light beams to detect the intensity of the one of the split light beams, servo signal generating means for generating a tracking error signal and a focusing error signal based on the output of the first detecting means, an optical waveguide disposed between the beam splitting means and the first detecting means, the optical waveguide crossing an optical axis of the one of the split light beams, an optical coupler disposed on the optical waveguide for separating part of the one of the split light beams from the one of the split beams to form a guided light beam which is guided in the optical waveguide, second detecting means for receiving the guided light beam from the optical waveguide to detect the intensity of at least one polarization component of the guided light beam, and information signal reproducing means for reproducing the recording information based on the output of the second detecting means.

11 Claims, 8 Drawing Sheets

PICKUP DEVICE FOR A MAGNETO-OPTICAL INFORMATION RECORDING SYSTEM

BACKGROUND OF THE INVENTION

1. Field of the Invention

The present invention relates to an optical information reproducing device, and more specifically, relates to an optical information reproducing device such as an optical pickup suitably used for a magneto-optical disk unit, in which the optical system is compact and integrated.

2. Description of the Related Art

An optical disk can store a huge amount of information with high density. In recent years, efforts for using such an optical disk have been in progress in various fields. Under such circumstances, it is important to provide a compact and lightweight optical information reproducing device, such as an optical pickup, which is used for reproducing information recorded on such an optical disk. It has been found that using a diffraction element for an optical system for the optical pickup is effective for this purpose, and some proposals have been presented to realize such an optical pickup using a diffraction element.

Figure 9:
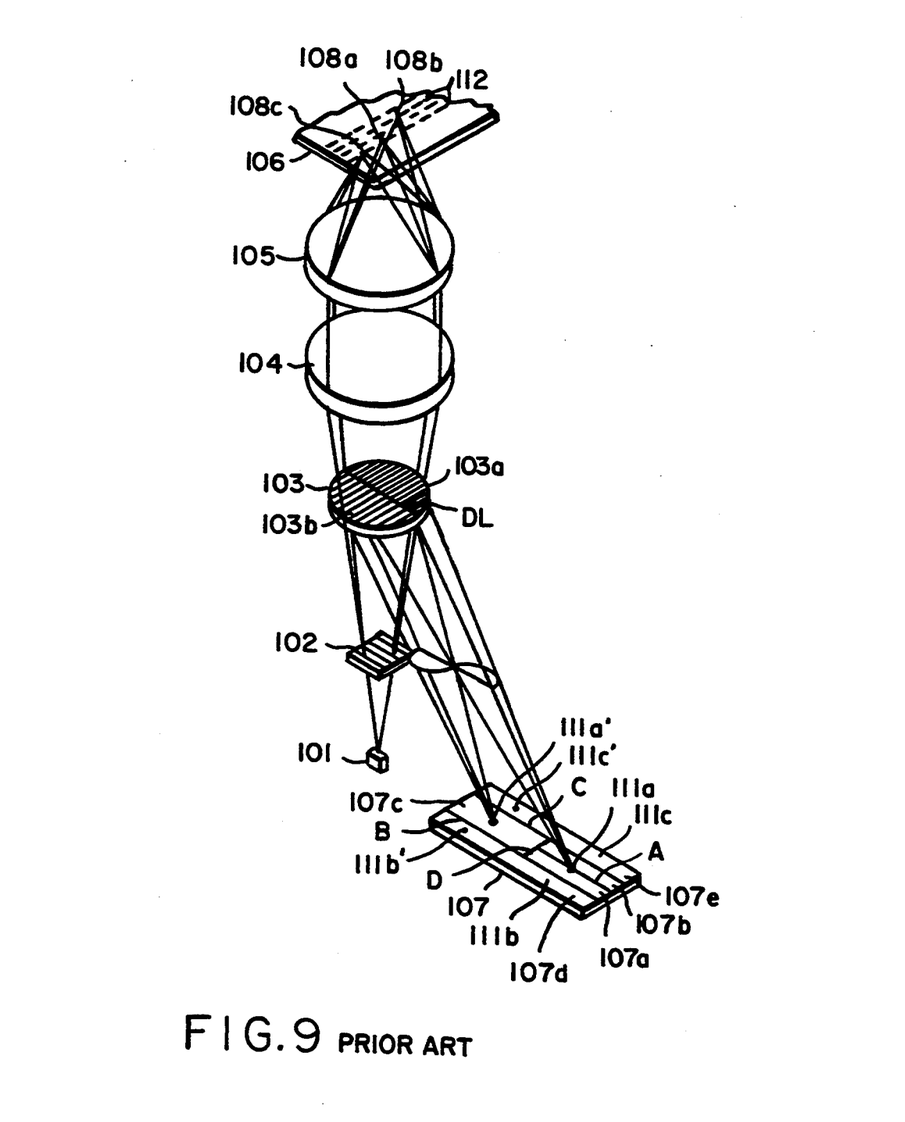
FIG. 9 is a perspective view of an optical system for a conventional optical pickup.

FIG. 9 schematically shows an optical system for a conventional optical pickup described in Y. Yoshida, et al., "Three beam CD optical pickup using a holographic optical element", Proc. Optical Data Storage Technologies, SPIE 1401 (1990), p. 58.

Referring to FIG. 9, divergent light emitted from a semiconductor laser 101 is introduced into a first diffraction element 102, where the incident light is split into a zero-order diffracted beam (main beam) and two first-order diffracted beams (sub-beams) for detecting a tracking error. Each of the split diffracted beams passes through a second diffraction element 103, and is converged on an information recording medium (hereinafter referred to as an "optical disk") 106 through a collimator lens 104 and an objective lens 105. The main beam forms a converged spot 108a on the optical disk 106, and the sub-beams form converged spots 108b and 108c on the optical disk 106. The light beams reflected from the optical disk 106 (hereinafter referred to as the "return beams") enter the optical system again through the objective lens 105, pass through the collimator lens 104, and are diffracted by the second diffraction element 103. The diffracted return beams are then converged on an optical detector 107. The first diffraction element 102 has a grating pattern of parallel straight lines with a predetermined grating pitch. The second diffraction element 103 has a grating pattern of curved lines determined so that the diffracted return beams can be properly converged on the optical detector 107.

Generally, a conventional optical information reproducing device has the following requirements: on an optical disk the light beam should be converged as a spot having a diameter of approximately 1 μm; and such a spot should precisely follow the information track on the optical disk. To satisfy these requirements, a focusing error detection mechanism and a tracking error detection mechanism are indispensable for the optical information reproducing device.

First, the focusing error detection mechanism will be described.

As shown in FIG. 9, the second diffraction element 103 is substantially circular and has two semicircular regions 103a and 103b divided by a division line DL.

The optical detector 107 has five detecting portions 107a, 107b, 107c, 107d, and 107e divided by four division lines A, B, C, and D.

Referring to FIG. 9, one part of the return main beam diffracted from the region 103a of the second diffraction element 103 forms a converged area 111a on the division line A of the optical detector 107, and the other part of the return main beam diffracted from the region 103b of the second diffraction element 103 forms a converged area 111a' on the detecting portion 107c of the optical detector 107.

Meanwhile, one of the return sub-beams reflected from the converged spot 108b on the optical disk 106 forms two converged areas 111b and 111b' on the detecting portion 107d of the optical detector 107. Likewise, the other return sub-beam reflected from the converged spot 108c on the optical disk 106 forms two converged areas 111c and 111c' on the detecting portion 107e of the optical detector 107.

Figure 10A:
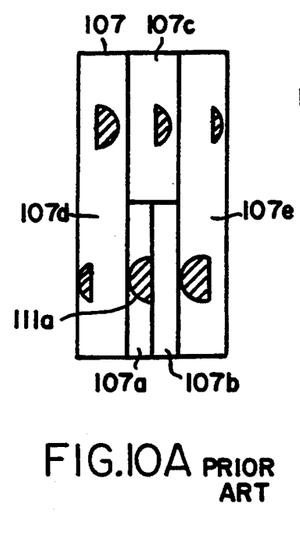
FIGS. 10A to 10C show positions of converged areas on an optical detector for the conventional optical pickup of FIG. 9.
Figure 10B:
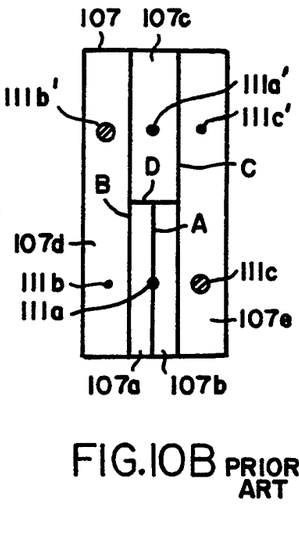

In the above-described configuration, when the divergent light emitted from the semiconductor laser 101 is precisely focused on the optical disk 106 by means of the objective lens 105, the converged area 111a is formed right on the division line A as a focal point, as shown in FIG. 10B. As a result, the light amounts output from the detecting portions 107a and 107b are equal to each other.

Figure 10C:
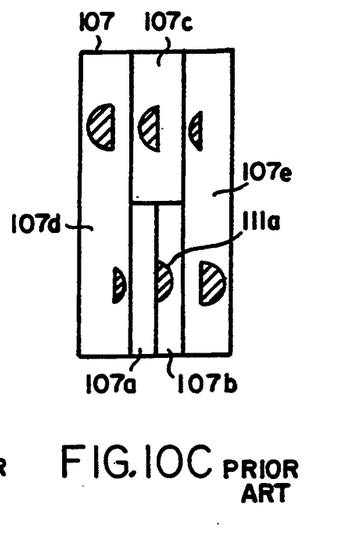

On the other hand, in cases where the optical disk 106 is moved closer to the objective lens 105, the focal points of the diffracted return beams are formed behind the optical detector 107. As a result, as shown in FIG. 10C, the converged area 111a is formed on the detecting portion 107b in a semicircular shape. Reversely, in cases where the optical disk 106 is moved farther from the objective lens 105, the focal points of the diffracted return beams are formed in front of the optical detector 107. As a result, as shown in FIG. 10A, the converged area 111a is formed on the detecting portion 107a in a semicircular shape.

Thus, a focusing error signal FES is obtained by operating the following equation:

$$FES = S1 - S2 \tag{1}$$

wherein S1 and S2 are output signals from the detecting portions 107a and 107b of the optical detector 107. The operation is performed with a subtracter (not shown).

Based on the focusing error signal FES obtained as described above as a servo signal, the objective lens 105 is driven by an actuator (not shown) so as to move into a proper position where the converged spot 108a can be precisely on an information track 112 as a focal point.

Next, the tracking error detection mechanism for the above optical pickup will be described.

Figure 11A:
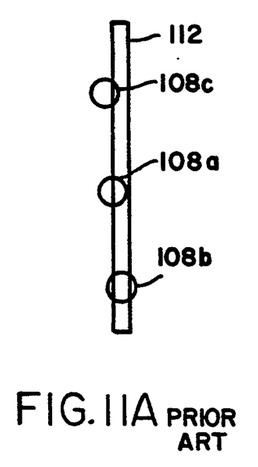
FIGS. 11A to 11C show positions of converged spots on an optical disk for the conventional optical pickup of FIG. 9.
Figure 11B:
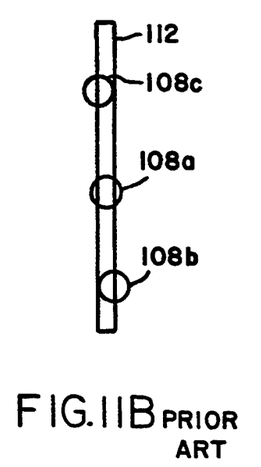
Figure 11C:
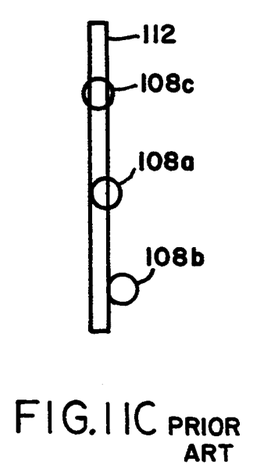

FIGS. 11A to 11C show the relative positions of the converged spots 108a, 108b, and 108c and the information track 112 on the optical disk 106. As shown in FIG. 11B, the converged spots 108b and 108c formed by the sub-beams are located apart from the converged spot 108a formed by the main beam by the same distance and are located in the opposite directions to each other along the information track 112. Further, the converged spots 108b and 108c are slightly shifted with regard to the information track 112 in the opposite directions to each other.

In the case where the information track 112 is shifted to the right with regard to the converged spot 108a due to some cause, as shown in FIG. 11A, the converged spot 108b is located substantially to the right on the information track 112. This results in that the intensity of the return beam reflected from the converged spot 108b decreases. On the contrary, the converged spot 108c is located farther from the information track 112, so that the intensity of the return beam reflected from the converged spot 108c increases.

On the contrary, in the case where the information track 112 is shifted to the left with regard to the converged spot 108a due to some cause, as shown in FIG. 11C, the converged spots 108b and 108c are located reversely to the former case. This results in that the intensity of the return beam reflected from the converged spot 108b increases, while that of the return beam reflected from the converged spot 108c decreases.

As described earlier, the sub-beams reflected from the converged spots 108b and 108c are converged on the detecting portions 107d and 107e of the optical detector 107, respectively. Accordingly, a tracking error signal TES is obtained by operating the following equation:

$$TES = S4 - S5 \qquad (2)$$

wherein S4 and S5 are output signals from the detecting portions 107d and 107e. The operation is performed with a subtracter (not shown).

Based on the tracking error signal TES obtained as described above as a servo signal, the objective lens 105 is driven by an actuator (not shown) in order to move to a proper position where the converged spot 108a can be precisely on the information track 112 as a focal point.

Figure 12:
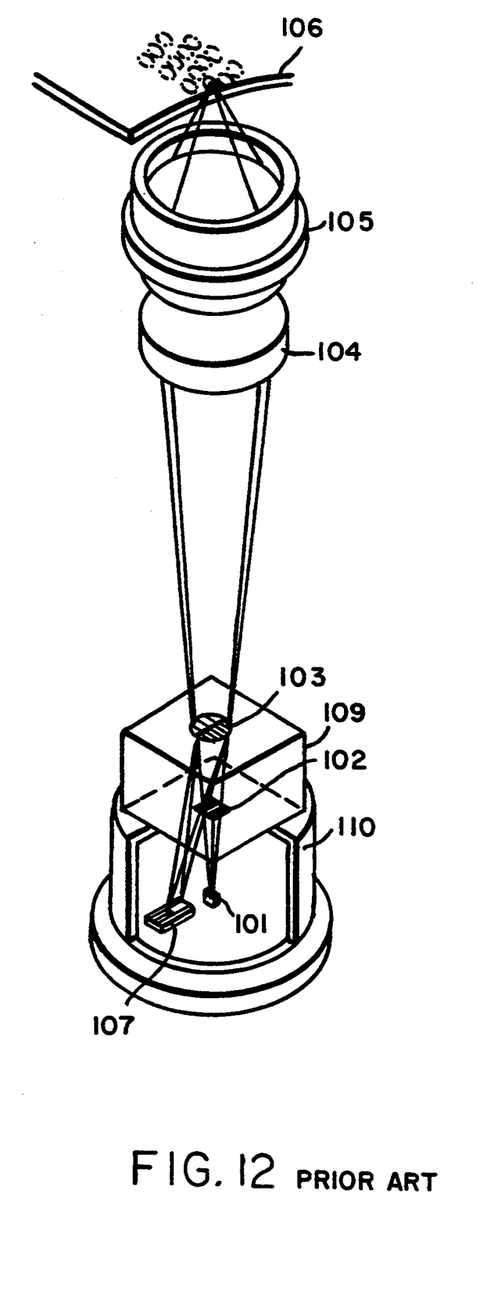
FIG. 12 is a perspective view showing the optical system for the conventional optical pickup of FIG. 9 in more concrete configuration.

FIG. 12 shows the conventional optical pickup shown in FIG. 9 in a more concrete configuration. Referring to FIG. 12, the first diffraction element 102 and the second diffraction element 103 are formed on the bottom surface and the top surface of a glass substrate 109, respectively, by etching. The semiconductor laser 101 and the optical detector 107 are disposed inside a hermetically sealed package 110.

Figure 13:
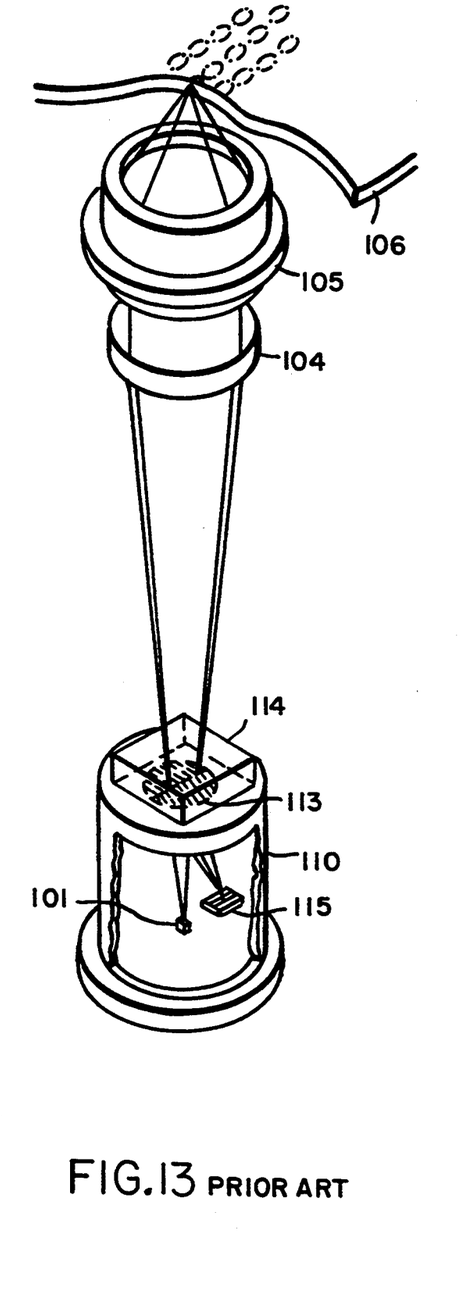
FIG. 13 is a perspective view of an optical system for another conventional optical pickup.

FIG. 13 shows another conventional optical pickup with a diffraction element, which employs a "one-beam" method for tracking error detection. In FIG. 13, like components are denoted as like reference numerals as those in FIG. 12 for simplification. This conventional optical pickup is different from the optical pickup shown in FIGS. 9 and 12 in that a single diffraction element 113 is formed on the bottom surface of a glass substrate 114, and that an optical detector 115 is divided into four portions. The focusing error detection mechanism and the tracking error detection mechanism for this conventional optical pickup are mostly similar to those for the optical pickup shown in FIG. 9. The description of these mechanisms is therefore omitted. Refer to Y. Kurata, et al., "CD optical pickup using a computer generated holographic optical element", Proc. Optical Data Storage and Scanning Technologies, SPIE, 1139 (1989), p. 161, for details.

Such conventional optical pickups using a diffraction element and integrated as described above have an advantage of being less influenced by the environment because the light source and the optical detector are disposed in the same package. Also, they can be compact and lightweight, and can be fabricated at a reduced cost.

Figure 14:
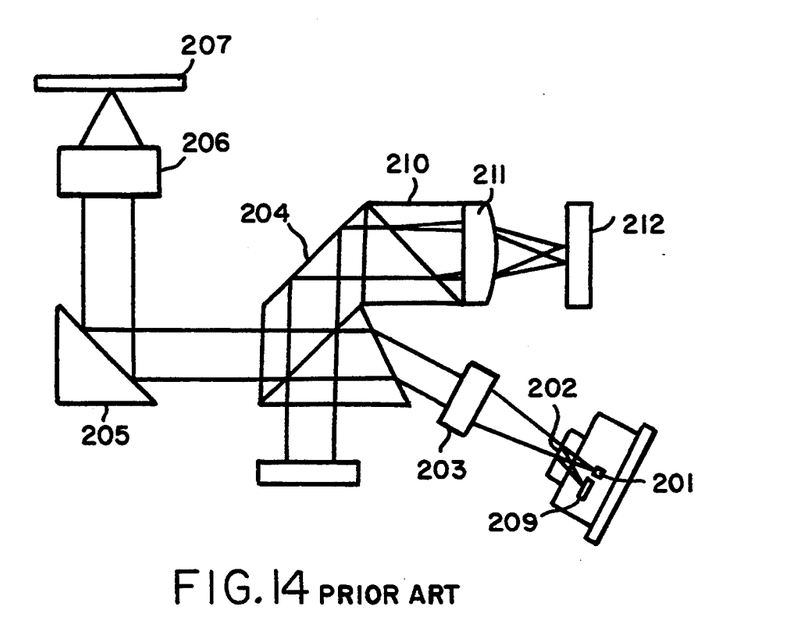
FIG. 14 is a schematic view of an optical system for a conventional optical pickup for a magneto-optical disk.

In recent years, with the spread of optical disks, a magneto-optical disk has attracted attention as a rewritable optical disk. FIG. 14 schematically shows an optical system for a conventional optical pickup directed for a megneto-optical disk by use of a diffraction element.

Referring to FIG. 14, divergent light emitted from a semiconductor laser 201 passes through a diffraction element 202 as a zero-order diffracted beam, and is converted into a parallel beam by a collimator lens 203. The parallel beam passes through a composite prism 204, a 45° mirror 205, and an objective lens 206 so as to be converged on a magneto-optical disk 207.

The light beam reflected from the magneto-optical disk 207 (the return beam) enters the optical system again through the objective lens 206. Part of the return beam passes through the composite prism 204 and the collimator lens 203, and is diffracted by the diffraction element 202 so as to be converged on an optical detector 209 for detecting a focusing error and a tracking error. The diffraction element 202 has a pattern of curved lines determined so that the diffracted return beam can be properly converged on the optical detector 209, though not shown in FIG. 14. Since the focusing error detection mechanism and the tracking error detection mechanism for this optical pickup are similar to those for the optical pickup shown in FIG. 9, the description of these mechanisms is omitted. Refer to Sato, et al., "A pickup for a 3.5-inch magneto-optical disk", Sharp Technical Report, No. 50 (1991), pp. 20–24, for details.

The remaining part of the return beam is reflected twice in the composite prism 204 so as to reach a Wollaston prism 210, where it is split into two different polarized beams. The polarized beams are then converged on a two-division photo diode 212 through a converging lens 211. The difference of outputs from the two divisions of the photo diode 212 is calculated so as to reproduce an information signal.

Figure 15:
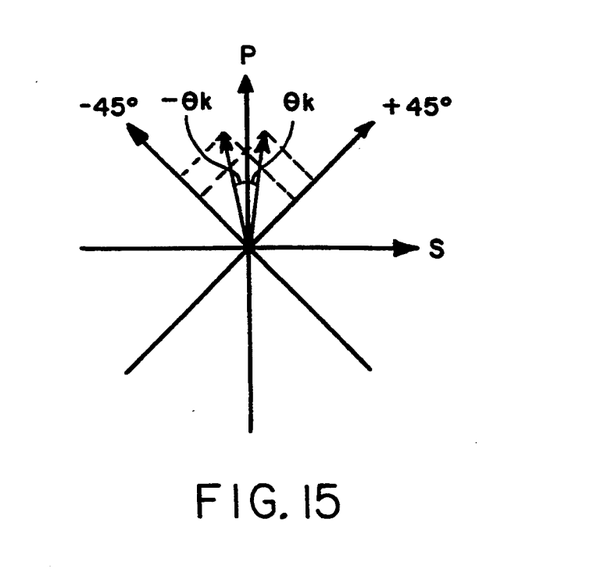
FIG. 15 shows the principle for detecting a magneto-optical signal.

As is known, when P-polarized light, for example, is radiated onto a position on a magneto-optical disk, the light is reflected from the position with the plane of polarization of the light rotated by $\theta k$ or $-\theta k$ determined corresponding to the direction of magnetization at the position irradiated with the light (refer to FIG. 15). The degree of this rotation is detected as an information signal. Generally, in order to detect the degree of the rotation, the return light is split into two polarization components having $\pm 45°$ directions, and the difference of the intensity of the two components is calculated. The crystal orientation of the Wollaston prism 210 is determined so that such polarized components can be obtained.

The optical pickups for an optical disk shown in FIGS. 9 and 13 which can be compact and light-weight are suitable for a reproduction-only type disk unit and a write-once type disk unit. However, these optical pickups are not provided with the function of detecting a magneto-optical signal, and thus are not applicable to a rewritable magneto-optical disk unit. Meanwhile, the optical pickup for a magneto-optical disk shown in FIG. 14 includes a prism as a component of the optical system for detecting a magneto-optical signal. This makes it difficult to drastically reduce the size and weight of the optical pickup, though the reduction is possible to some extent by using a diffraction element. Furthermore, the Wollaston prism used for polarization splitting is made of expensive crystal, thereby preventing a cost reduction of the optical pickup.

SUMMARY OF THE INVENTION

The optical information reproducing device of this invention includes: a light source for generating a light beam; an optical system for converging the light beam generated by the light source on a magneto-optical recording medium on which recording information is recorded and for converging a return light beam reflected from the magneto-optical recording medium; beam splitting means for splitting the return light beam into split light beams; first detecting means for receiving one of the split light beams to detect the intensity of the one of the split light beams; servo signal generating means for generating a tracking error signal and a focusing error signal based on the output of the first detecting means; an optical waveguide disposed between the beam splitting means and the first detecting means, the optical waveguide crossing an optical axis of the one of the split light beams; an optical coupler disposed on the optical waveguide for separating part of the one of the split light beams from the one of the split beams to form a guided light beam which is guided in the optical waveguide; second detecting means for receiving the guided light beam from the optical waveguide to detect the intensity of at least one polarization component of the guided light beam; and information signal reproducing means for reproducing the recording information based on the output of the second detecting means.

In one embodiment, the beam splitting means is a diffraction element.

In another embodiment, the optical waveguide, the first detecting means, and the second detecting means are integrally formed on a substrate.

In another embodiment, the optical information reproducing device further includes packaging means for packaging the light source and the substrate.

In another embodiment, the optical information reproducing device further includes polarized beam splitting means for splitting the guided light beam into a TE polarized light beam and a TM polarized light beam.

In another embodiment, the at least one polarization component is the TE polarized light beam.

In another embodiment, the polarized beam splitting means is an analyzer for absorbing the TM polarized light beam, while allowing the TE polarized light beam to pass therethrough.

In another embodiment, the optical information reproducing device further includes a converging lens for converging the TE polarized light beam and the TM polarized light beam on the second detecting means.

In another embodiment, the optical information reproducing device further includes optical dividing means disposed between the light source and the optical system, for splitting the light beam generated by the light source into a main beam and two sub-beams.

In another embodiment, the optical information reproducing device further includes a transparent substrate disposed on the packaging means, the transparent substrate having a first surface contacting the packaging means and a second surface opposing the first surface, wherein the beam splitting means is disposed on the second surface and the optical dividing means is disposed on the first surface.

In another embodiment, the optical coupler is a grating coupler.

According to the optical pickup of the present invention, an optical system for detecting a megneto-optical signal is formed integrally with an optical detector for detecting focusing and tracking errors. Further, such an integrated optical detector and the light source are disposed in the same package.

Thus, the invention described herein makes possible the advantages of (1) providing an optical information reproducing device for a magneto-optical disk which is compact and lightweight with a reduced number of optical components, as well as being less influenced by the environment, and (2) providing an optical reproducing device for a magneto-optical disk which can be fabricated with reduced cost without the necessity of using a Wollaston prism.

These and other advantages of the present invention will become apparent to those skilled in the art upon reading and understanding the following detailed description with reference to the accompanying figures.

DESCRIPTION OF THE PREFERRED EMBODIMENTS

EXAMPLE 1

Figure 1:
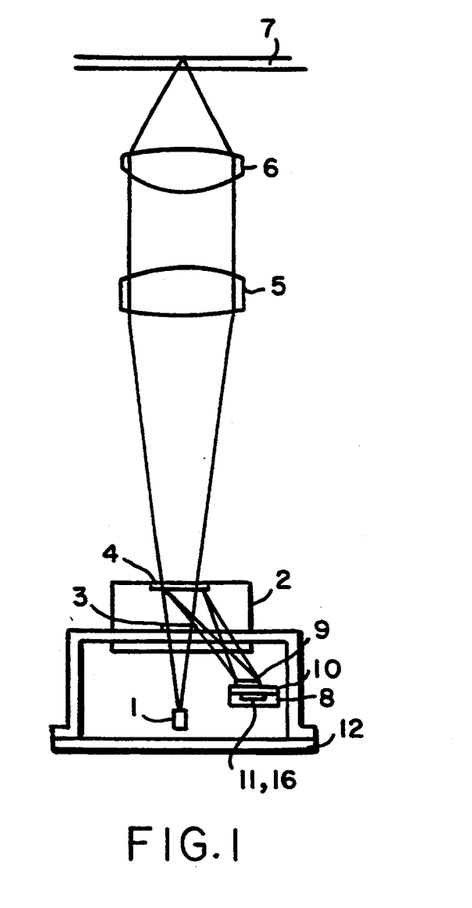
FIG. 1 is a sectional view of an optical system for an optical pickup according to the present invention.
Figure 2:
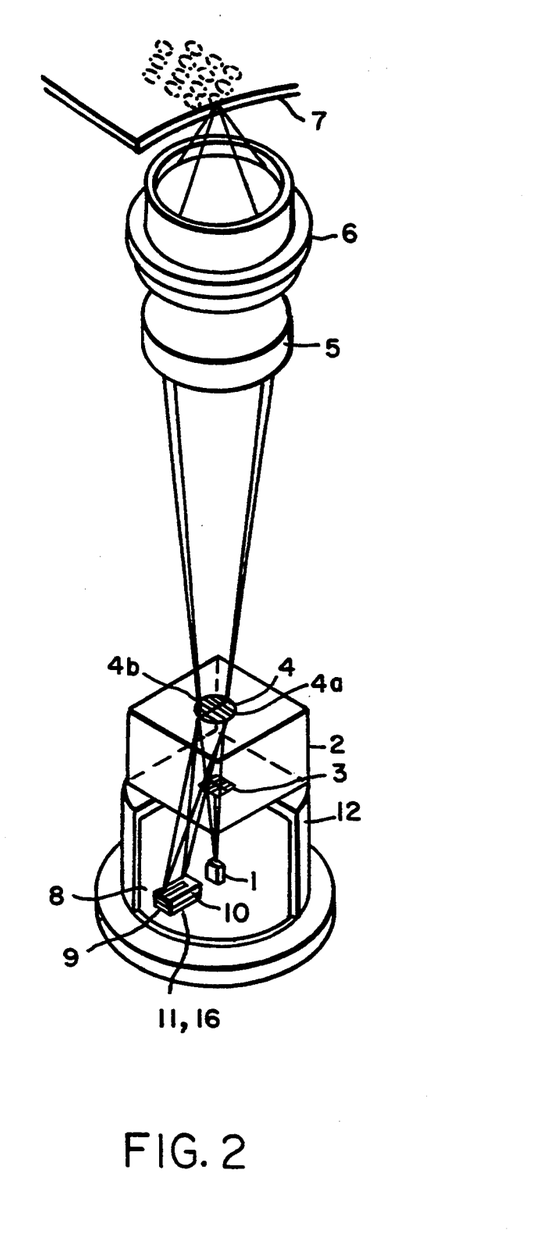
FIG. 2 is a perspective view of the optical system of FIG. 1.

FIGS. 1 and 2 are a sectional view and a perspective view of an optical pickup according to the present invention.

Referring to FIGS. 1 and 2, divergent light emitted from a semiconductor laser 1 is introduced into a first diffraction element 3 disposed on the bottom surface of a glass substrate 2, where the light is split into a zero-order diffracted beam (main beam) and two first-order diffracted beams (sub-beams) for detecting a tracking error. Each of the split diffracted beams passes through a second diffraction element 4 disposed on the top surface of the glass substrate 2, and is converged on a magneto-optical disk 7 through a collimator lens 5 and an objective lens 6. The light beams reflected from the magneto-optical disk 7 (the return beams) enter the optical system again through the objective lens 6, pass through the collimator lens 5, and are diffracted by the second diffraction element 4. The diffracted return beams are then converged on an optical waveguide element 8.

Figure 3A:
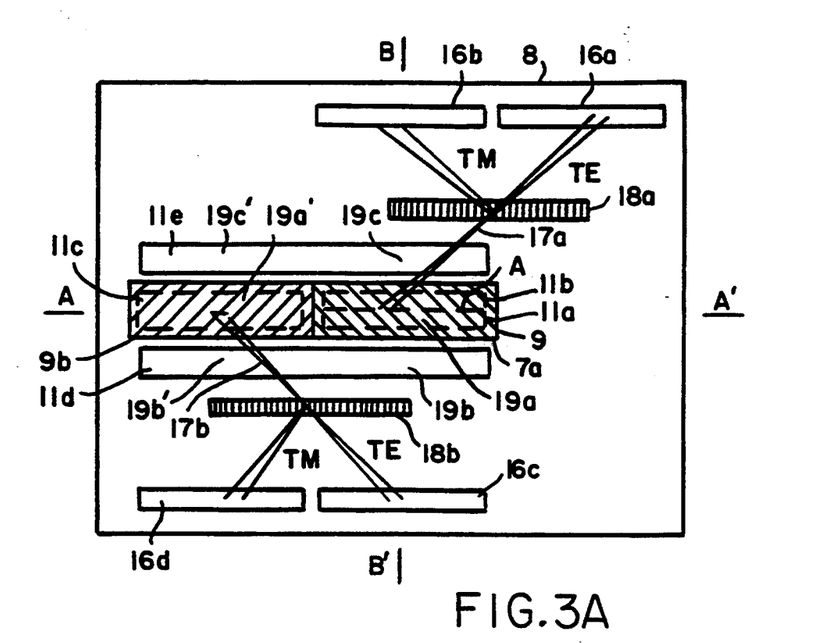
FIG. 3A is a top view of an optical waveguide element for an optical pickup according to the present invention.
Figure 3B:
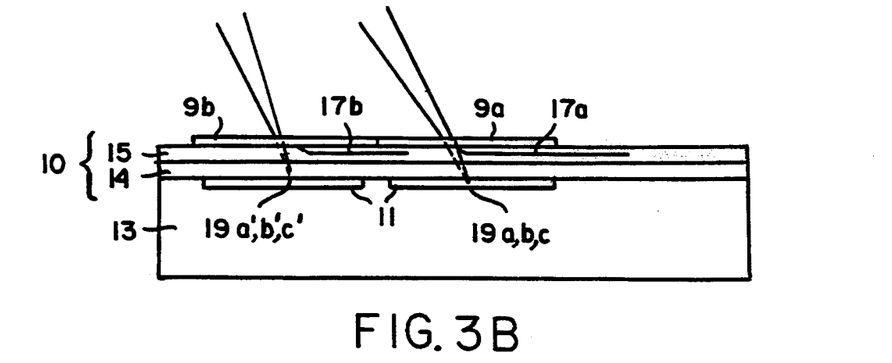
FIG. 3B is a sectional view of the optical waveguide element taken along line A—A' of FIG. 3A.
Figure 3C:
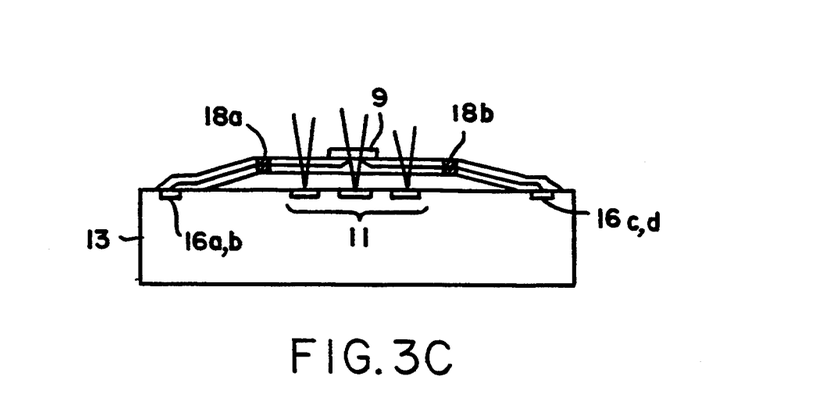
FIG. 3C is a sectional view of the optical waveguide element taken along line B—B' of FIG. 3A.

FIG. 3A is a top view of the optical waveguide element 8, and FIGS. 3B and 3C are sectional views thereof taken along line A—A' and line B—B' of FIG. 3A, respectively. Referring to FIGS. 3A to 3C, each of the diffracted return beams is converged on an optical coupler 9 of the optical waveguide element 8. Then, part of the beam is introduced into a first optical detector 11 through an optical waveguide 10. The remaining part thereof is guided into the optical waveguide 10 and propagates therethrough so as to be introduced to a second optical detector 16.

As shown in FIG. 2, the first diffraction element 3 has a pattern of parallel straight lines with a predetermined grating pitch. The second diffraction element 4 is substantially circular and divided into two semicircular regions 4a and 4b. Each of the regions 4a and 4b has a grating pattern of curved lines determined so that the diffracted return beams can be properly converged on the first optical detector 11 formed in the optical waveguide element 8.

Referring to FIGS. 3A to 3C, the configuration of the optical waveguide element 8 will be described.

Figure 8:
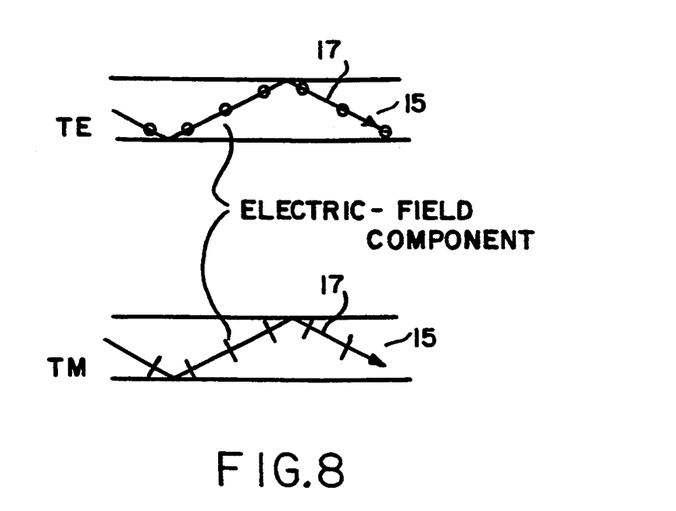
FIG. 8 shows the polarization of guided light in the optical waveguide element according to the present invention.

The optical waveguide element 8 includes the first and the second optical detectors 11 and 16 formed in the upper surface area of a silicon substrate 13. The optical waveguide 10 composed of a clad layer 14 and a waveguide layer 15 is formed over the surface of the silicon substrate 13 including the first and the second optical detectors 11 and 16. Then, the optical coupler 9 is formed on the surface of the optical waveguide 10. The first optical detector 11 includes five detecting portions 11a, 11b, 11c, 11d, and 11e. The second optical detector 16 includes four detecting portions 16a, 16b, 16c, and 16d. The optical coupler 9 includes two regions 9a and 9b, and is formed on a portion of the surface of the optical waveguide 10 located above the detecting portions 11a, 11b, and 11c. The optical waveguide element 8 also includes polarized beam splitters 18a and 18b for splitting light propagating in the optical waveguide 10 (hereinafter referred to as "guided light" or a "guided beam") into components of TE polarization and TM polarization. As shown in FIG. 8, the TE polarization is the condition where an electric-field component of guided light 17 is parallel to the waveguide layer 15, while the TM polarization is the condition where the electric-field component of guided light 17 is vertical to the waveguide layer 15.

Part of the return main beam reflected from the magneto-optical disk 7 and diffracted from the region 4a of the second diffraction element 4 is introduced into the optical coupler 9, where part of the beam is guided to the optical waveguide 10 so as to propagate therethrough, and the remaining part of the beam passes through the optical waveguide 10 to form a converged area 19a on a division line A of the first optical detector 11 as shown in FIG. 3A. Likewise, the other part of the return main beam diffracted from the region 4b of the second diffraction element 4 forms a converged area 19a' on the detecting portion 11c. One of the sub-beams forms converged areas 19b and 19b' on the detecting portion 11d, and the other sub-beam forms converged areas 19c and 19c' on the detecting portion 11e.

As is apparent from the above description, the focusing error detection mechanism for the optical pickup of this example is the same as that for the conventional optical pickup shown in FIG. 9, except that in this example part of the return main beam is guided into the optical waveguide 10 through the optical coupler 9. Accordingly, a focusing error signal FES can be obtained by detecting the difference of outputs of the detecting portions 11a and 11b and operating an equation similar to Equation (1). Also, the tracking error detection mechanism for the optical pickup of this example is the same as that for the conventional optical pickup shown in FIG. 9. Accordingly, a tracking error signal TES can be obtained by detecting the difference of outputs of the detecting portions 11d and 11e and operating an equation similar to Equation (2).

In addition to the above error detection mechanisms, the optical waveguide element 8 for the optical pickup of this example has a function of detecting an information signal recorded on a magneto-optical disk by guided part of the return main beam into the optical waveguide 10. That is, part of the return main beam is guided into the optical waveguide 10 through the optical coupler 9 of the optical waveguide element 8 and propagates in the optical waveguide 10 as guided beams 17a and 17b. A magneto-optical signal can be detected by detecting polarization components of the guided beams 17a and 17b.

The principle of the detection of a magneto-optical signal will be described. Part of the return main beam diffracted from the region 4a of the second diffraction element 4 is partly guided into the optical waveguide 10 through the region 9a of the optical coupler 9 and propagates in the optical waveguide 10 as a guided beam 17a. The guided beam 17a is split into a TE polarization component and a TM polarization component by the polarized beam splitter 18a. The TE polarized beam and the TM polarized beam are detected by the detecting portions 16a and 16b of the second optical detector 16, respectively. Likewise, the other part of the return main beam diffracted from the region 4b of the second diffraction element 4 is partly guided into the optical waveguide 10 through the region 9b of the optical coupler 9 and propagates in the optical waveguide 10 as a guided beam 17b. The guided beam 17b is split into a TE polarization component and a TM polarization component by the polarized beam splitter 18b. The TE polarized beam and the TM polarized beam are detected by the detecting portions 16c and 16d of the second optical detector 16, respectively.

Figure 6A:
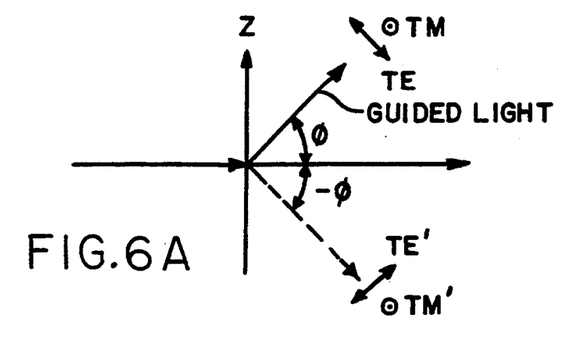
FIGS. 6A and 6B show the relationship between the polarization of incident light to the optical waveguide element according to the present invention and the polarization of guided light.
Figure 6B:
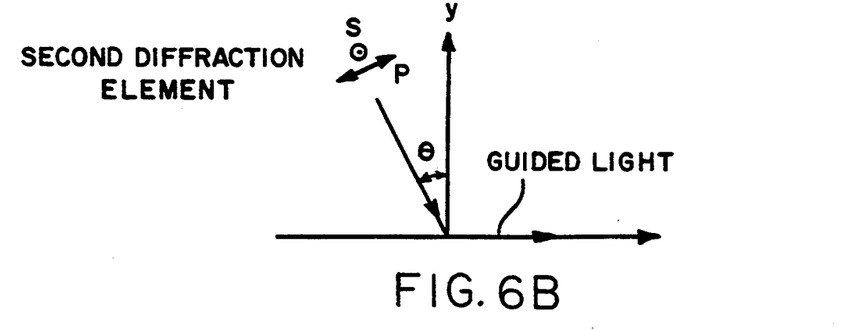

Referring to FIGS. 6A and 6B, the relationship between the polarization of the diffracted return beam incident to the optical waveguide element 8 and the polarization of the guided beams 17a and 17b will be described.

The x-z plane is parallel to the optical waveguide 10. Assume that the return beam diffracted from the second diffraction element 4 is on the x-y plane with an incident angle of $\theta$ with regard to the y axis, and that the diffracted return beam is converted by the optical coupler 9 to the guided beam which propagates on the x-z plane. Then, when the guided beam propagates in the direction of an angle $\phi$ with regard to the x axis, the $+45°$ polarization component of the diffracted return beam corresponds to the TE polarization component of the guided beam, while the $-45°$ polarization component of the diffracted return beam corresponds to the TM polarization component of the guided beam. On the contrary, when the guided beam propagates in a direction of an angle $-\phi$ with regard to the x axis, the $+45°$ polarization component of the diffracted return beam corresponds to the TM polarization component of the guided beam, while the $-45°$ polarization component of the diffracted return beam corresponds to the TE polarization component of the guided beam.

Accordingly, a magneto-optical signal M0 is obtained by operating the following equation:

$$M0=M1+M4-(M2+M3) \tag{3}$$

wherein M1, M2, M3, and M4 are outputs of the detecting portions 16a, 16b, 16c, and 16d of the second optical detector 16, respectively. The operation is performed with an adder and a subtracter (not shown).

As described above, according to the optical pickup of this example, the plane of polarization of the diffracted return beam can be rotated and split by converting the beam three-dimensionally so as to propagate in appropriate directions in the optical waveguide 10, thereby to obtain the same effect as that provided by the Wollaston prism.

Figure 7:
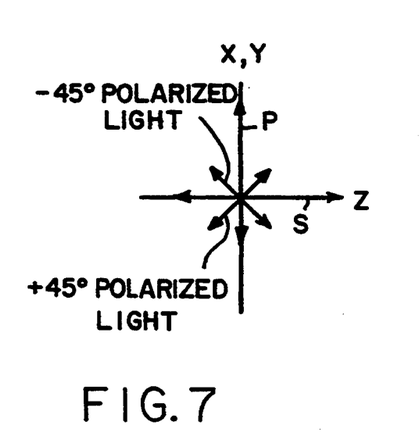
FIG. 7 shows the polarization of incident light to the optical waveguide element according to the present invention.

In order to allow the $+45°$ polarized beam shown in FIG. 7 to correspond to the TE polarized beam, the angle $\phi$ should be determined so that the direction of the guided beam be vertical to the projection of the $+45°$ polarized beam on the x-z plane. When the incident angle $\theta$ of the diffracted return beam is determined, the angle $\phi$ is obtained by operating the following equation:

$$\phi=\operatorname{Tan}^{-1}(1/\cos\theta) \tag{4}$$

When a grating coupler is used as the optical coupler 9, the direction of the guided beam can be adjusted by changing the inclination of the lines of the grating coupler.

In this example, the direction of the guided beam was determined so that the $\pm 45°$ polarized beams correspond to the TE and TM polarized beams. However, depending on the properties of the optical disk to be used, the direction of the guided beams may also be determined so that the polarized beams at angles of $\pm 30°$ with regard to the z axis correspond to the TE and TM polarized beams.

It is desirable that the guided beams 17a and 17b converted at the regions 9a and 9b of the optical coupler 9 propagate through the optical waveguide 10 in directions crossing each other as shown in FIGS. 3A to 3C. This is because, when the directions of the guided beams 17a and 17b cross each other, the polarization directions thereof also cross each other. As a result, even if the properties of the polarized beam splitters or the like vary due to production error, such variation can be offset by the operation and thus will not seriously influence the result. Furthermore, with the above setting, the guided beam 17a (or 17b) and other beams branching therefrom can be prevented from entering the detecting portions 16c and 16d (or 16a and 16b). Also, the arrangement of the second optical detector 16 can be simplified.

The optical waveguide element 8 shown in FIG. 3A is fabricated as follows:

After the formation of the optical detectors 11 and 16 in the upper surface area of the silicon substrate 13, silicon dioxide is grown on the silicon substrate 13 including the optical detectors 11 and 16 by thermal oxidation, for example, so as to form the clad layer 14. Then, Corning #7059 glass or the like is deposited on the clad layer 14 by sputtering, for example, so as to form the waveguide layer 15, completing the optical waveguide 10 composed of the clad layer 14 and the waveguide layer 15. Then, a grating coupler as the optical coupler 9 is formed on the optical waveguide 10 by patterning a resist by electron beam drawing or the like and sputtering the same as for the waveguide layer 15. The polarized beam splitters 18a and 18b of a grating type, for example, are formed by patterning the same as for the optical coupler 9 and by reactive ion etching.

EXAMPLE 2

Figure 4:
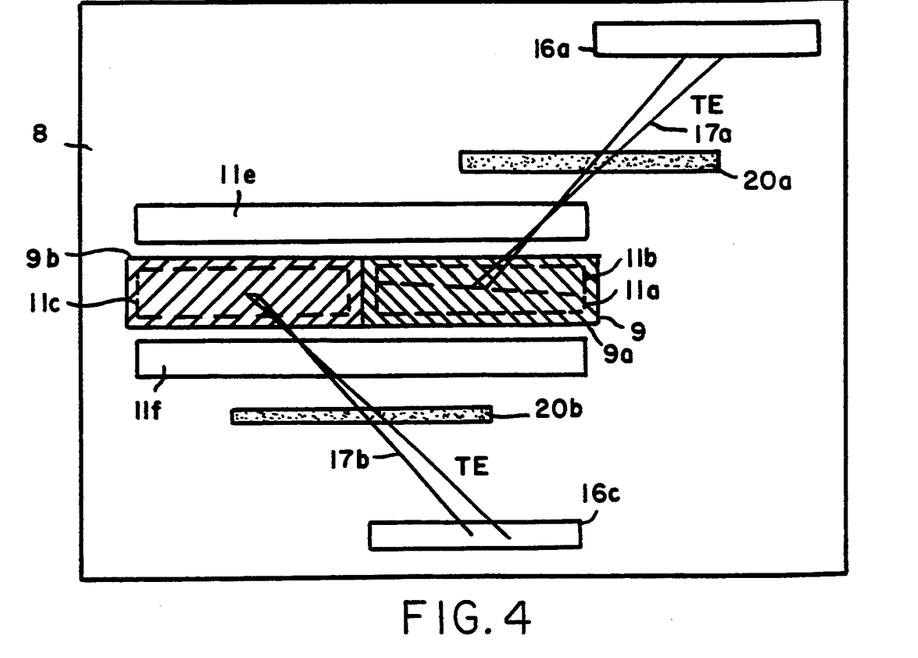
FIG. 4 is a top view of another optical waveguide element for an optical pickup according to the present invention.

FIG. 4 shows a second example of the optical waveguide element 8 according to the present invention. Like components are denoted as like reference numerals as those in FIG. 3. In this example, analyzers 20a and 20b are disposed in place of the polarized beam splitters, and the second optical detector 16 has only two detecting portions 16a and 16c. The analyzers 20a and 20b are formed, for example, by applying a metal film made of Al or the like to appropriate portions over the waveguide layer 15. Such analyzers 20a and 20b absorb the TM polarized beam, while allowing the TE polarized beam to pass therethrough. Accordingly, the magneto-optical signal M0 can be obtained by operating the following equation:

$$M0=M1-M3 \tag{5}$$

wherein M1 and M3 are outputs of the detecting portions 16a and 16c of the second optical detector 16, respectively. The operation is performed by a subtracter (not shown).

The focusing error detection and the tracking error detection are performed in the same manner as in Example 1.

EXAMPLE 3

Figure 5:
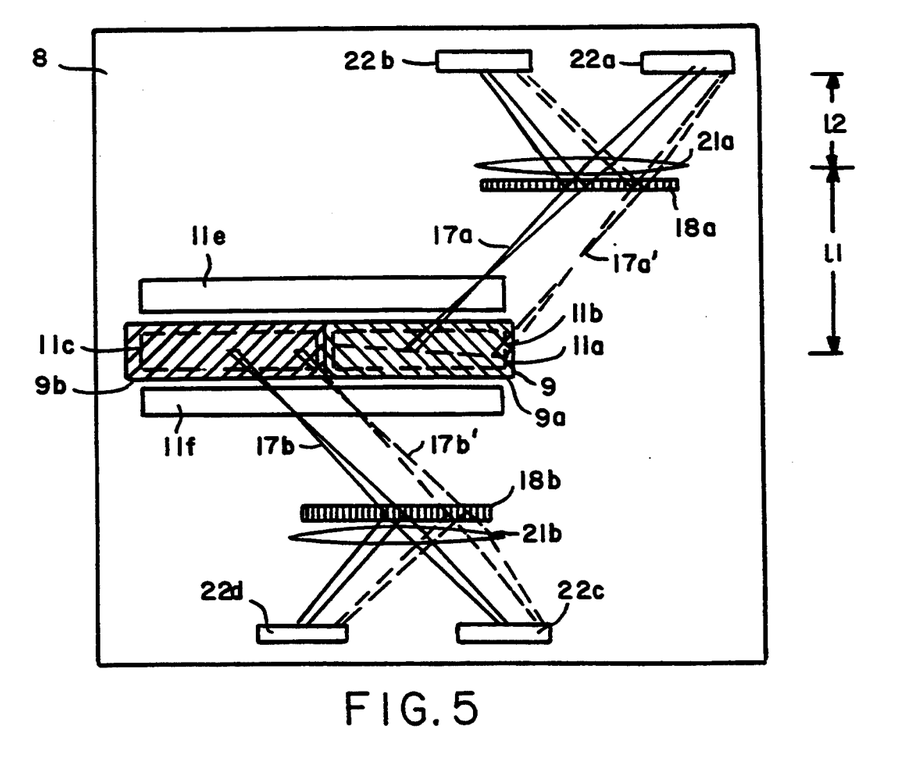
FIG. 5 is a top view of yet another optical waveguide element for an optical pickup according to the present invention.

FIG. 5 shows a third example of the optical waveguide element 8 according to the present invention. Like components are denoted as like reference numerals as those in the previous examples. In this example, converging lenses 21a and 21b are additionally provided in the optical waveguide 10 for converging guided beams 17a and 17b, respectively, when they diverge too widely.

In this example, the distance $l_1$ between the optical coupler 9 and the converging lens 21a (or 21b) is set larger than the distance $l_2$ between the converging lens 21a (or 21b) and detecting portions 22a and 22b (or 22c and 22d), i.e., $l_2 < l_1$. With this arrangement, even when the position where the diffracted return beam is incident on the optical waveguide element 8 is shifted and thus guided beams 17a' and 17b' propagate through the optical waveguide 10 as shown in dash lines in FIG. 5, such guided beams 17a' and 17b' can be converged on the small-size detecting portions 22a and 22b (or 22c and 22d) through the converging lens 21a (or 21b). This makes it possible to detect a magneto-optical signal with high frequency. A luneburg lens, a geodesic lens, a grating lens, and a refractive index distribution lens can be used for the converging lenses 21a and 21b.

The optical pickup of the present invention is used not only for the focusing and tracking error detection as described in the above examples, but for other applications as well. The position of the division line on the second diffraction element 4 and the direction of grating lines formed on each region divided by the division line, as well as the shape of the first optical detector 11, are not limited to those in the above examples, but can be changed depending on the applications. Therefore, the optical pickup of the present invention can be modified to an optical pickup where a tracking error is detected by the one-beam method as shown in FIG. 13. Furthermore, the optical pickup of the present invention can be provided with an electronic circuit for current-voltage conversion or for signal amplification, for example, on the silicon substrate, in addition to the optical detectors, so as to obtain the effect of reducing the influence of noise from outside.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information reproducing device comprising:
    a light source for generating a light beam;
    an optical system for converging said light beam generated by said light source on a magneto-optical recording medium on which recording information is recorded and for converging a return light beam reflected from said magneto-optical recording medium;
    beam splitting means for splitting said return light beam into split light beams;
    first detecting means for receiving one of said split light beams to detect the intensity of said one of said split light beams;
    servo signal generating means for generating a tracking error signal and a focusing error signal based on the output of said first detecting means;
    an optical waveguide disposed between said beam splitting means and said first detecting means, said optical waveguide crossing an optical axis of said one of said split light beams;
    an optical coupler disposed on said optical waveguide for separating part of said one of said split light beams from said one of said split beams to form a guided light beam which is guided in said optical waveguide;
    second detecting means for receiving said guided light beam from said optical waveguide to detect the intensity of at least one polarization component of said guided light beam; and
    information signal reproducing means for reproducing said recording information based on the output of said second detecting means.

2. An optical information reproducing device according to claim 1, wherein said beam splitting means is a diffraction element.

3. An optical information reproducing device according to claim 1, wherein said optical waveguide, said first detecting means, and said second detecting means are integrally formed on a substrate.

4. An optical information reproducing device according to claim 3, further comprising packaging means for packaging said light source and said substrate.

5. An optical information reproducing device according to claim 1, further comprising polarized beam splitting means for splitting said guided light beam into a TE polarized light beam and a TM polarized light beam.

6. An optical information reproducing device according to claim 5, wherein said at least one polarization component is said TE polarized light beam.

7. An optical information reproducing device according to claim 5, wherein said polarized beam splitting means is an analyzer for absorbing said TM polarized light beam, while allowing said TE polarized light beam to pass therethrough.

8. An optical information reproducing device according to claim 5, further comprising a converging lens for converging said TE polarized light beam and said TM polarized light beam on said second detecting means.

9. An optical information reproducing device according to claim 4, further comprising optical dividing means disposed between said light source and said optical system, for splitting the light beam generated by said light source into a main beam and two sub-beams.

10. An optical information reproducing device according to claim 9, further comprising a transparent substrate disposed on said packaging means, said transparent substrate having a first surface contacting said packaging means and a second surface opposing said first surface, wherein said beam splitting means is disposed on said second surface and said optical dividing means is disposed on said first surface.

11. An optical information reproducing device according to claim 1, wherein said optical coupler is a grating coupler.

* * * * *